(12) United States Patent
Beddoe et al.

(10) Patent No.: US 8,601,585 B2
(45) Date of Patent: Dec. 3, 2013

(54) MODIFICATION OF MESSAGES FOR ANALYZING THE SECURITY OF COMMUNICATION PROTOCOLS AND CHANNELS

(75) Inventors: Marshall A. Beddoe, San Francisco, CA (US); Kowsik Guruswamy, Sunnyvale, CA (US)

(73) Assignee: Spirent Communications, Inc., Sunnyvale, CA (US)

( * ) Notice: Subject to any disclaimer, the term of this patent is extended or adjusted under 35 U.S.C. 154(b) by 1077 days.

(21) Appl. No.: 11/745,338

(22) Filed: May 7, 2007

(65) Prior Publication Data

US 2008/0282352 A1  Nov. 13, 2008

(51) Int. Cl.
H04L 29/06 (2006.01)
(52) U.S. Cl.
USPC ............. 726/25; 370/244; 370/389; 709/206
(58) Field of Classification Search
USPC ............................................ 726/25; 370/244
See application file for complete search history.

(56) References Cited

U.S. PATENT DOCUMENTS

| | | | |
|---|---|---|---|
| 6,665,306 B1 * | 12/2003 | Thakur et al. | 370/419 |
| 7,242,681 B1 * | 7/2007 | Van Bokkelen et al. | 370/389 |
| 2004/0001443 A1 * | 1/2004 | Soon et al. | 370/244 |
| 2005/0015213 A1 * | 1/2005 | Somervill et al. | 702/117 |
| 2005/0111362 A1 * | 5/2005 | Freytsis et al. | 370/230 |
| 2005/0195820 A1 * | 9/2005 | Betts et al. | 370/392 |
| 2005/0198156 A1 * | 9/2005 | Cheng | 709/206 |
| 2007/0086389 A1 * | 4/2007 | Park et al. | 370/332 |
| 2007/0192687 A1 * | 8/2007 | Simard et al. | 715/523 |
| 2007/0204347 A1 | 8/2007 | Caceres et al. | |
| 2008/0120283 A1 * | 5/2008 | Liu et al. | 707/4 |

FOREIGN PATENT DOCUMENTS

WO  WO 2006/099536 A2  9/2006
WO  WO 2006/099536 A3  9/2006

OTHER PUBLICATIONS

Sengar, "MTPSec: Customizable Secure MTP3 Tunnels in SS7 Network", 2005, IEEE, p. 1-8.*
Finlay, I. et al., "Multiple Vulnerabilities in Many Implementations of the Simple Network Management Protocol (SNMP)," CERT® Advisory CA-2002-03, Pittsburgh, PA, US.

(Continued)

*Primary Examiner* — David Pearson
*Assistant Examiner* — Gregory Lane
(74) *Attorney, Agent, or Firm* — Haynes Beffel & Wolfeld LLP; Ernest J. Beffel, Jr.

(57) ABSTRACT

A system is used to analyze the implementation of a protocol by a device-under-analysis (DUA). The system includes a source endpoint, a destination endpoint (the DUA), and a message generator. The source endpoint generates an original message and attempts to send it to the DUA. The original message is intercepted by the message generator, which generates a replacement message. The replacement message is then sent to the DUA instead of the original message. The replacement message is deliberately improper so as to analyze the DUA's implementation of the protocol. The message generator includes a structure recognition system and a mutation system. The structure recognition system determines the underlying structure and/or semantics of a message. After the structure recognition system has determined the structure, it creates a description of the structure (a structure description). The mutation system modifies the message based on the structure description to generate a replacement message.

16 Claims, 2 Drawing Sheets

(56) References Cited

OTHER PUBLICATIONS

Griffin, J.L., "Testing Protocol Implementation Robustness," Published in the Proceedings of 29th Annual International Symposium on Fault-Tolerant Computing (FTC), Jun. 15-18, 1999, Madison, Wisconsin, US.
Kaksonen, R., "A Functional Method for Assessing Protocol Implementation Security," VTT Publications 448, 2001, 128 p.+ app. 15p., Technical Research Centre of Finland, FI.
Kaksonen, R. et al., "Software Security Assessment through Specification Mutations and Fault Injection," Proceedings of the Int'l Federation for Information Processing (IFIP) TC-6/TC-11 Fifth Joint Int'l Working Conference on Communications and Multimedia Security (CMS'01), May 21-22, 2001, Darmstadt, Germany, pp. 173-183.
Miller, B. et al., "Fuzz Revisited: A Re-examination of the Reliability of Unix Utilities and Services," Computer Sciences Department, Oct. 1995, pp. 1-23, Madison, Wisconsin, US.
Protos Test-Suite: c06-snmpvl, University of Oulu (ee.oulu.fi)—http://www.ee.oulu.fi/research/ouspg/protos/testing/c06/snmpvl/index, Oct. 17, 2002, pp. 1-26, Finland.
Protos Test-Suite: c06-Idapv3, University of Oulu (ee.oulu.fi)—http://www.ee.oulu.fi/research/ouspg/protos/testing/c06/Idapv3/index.html, Dec. 2001, pp. 1-13, Finland.
Rubin, S. et al., "On the Completeness of Attack Mutation Algorithms," 19th *IEEE Computer Security Foundations Workshop (CSFW)*, Jul. 2006, 14 pages, [Online] [Retrieved on Jan. 19, 2010] Retrieved from the Internet <URL: http://pages.cs.wisc.edu/~jha/jha-papers/security/CSFW_2006.pdf>.
U.S. Appl. No. 11/514,809, filed Sep. 1, 2006, Guruswamy.
U.S. Appl. No. 11/351,403, filed Feb. 10, 2006, Guruswamy.
Beddoe, M., "Network Protocol Analysis using Bioinformatics Algorithms," 2004, [Retrieved on May 17, 2007] Retrieved from the Internet <URL: http://www.4tphi.net/~awalters/PI/pi.pdf>.
Case, J. et al., "A Simple Network Management Protocol (SNMP)" (RFC 1157), May 1990, [Retrieved on May 17, 2007] Retrieved from the Internet <URL: http://www.faqs.org/rfcs/rfc1157.html>.
Marquis, S. et al., "SCL: A Language for Security Testing of Network Applications," Proceedings: 15th IBM Centre for Advanced Studies Conference (CASCON), Toronto, Canada, Oct. 2005, pp. 155-164, [Retrieved on May 17, 2007] Retrieved from the Internet <URL: http://post.queensu.ca/~trd/research/papers/marquisSCL.pdf>.
McCloghrie, K. et al., "Structure of Management Information Version 2 (SMIv2)" (RFC 2578), Apr. 1999, [Retrieved on May 17, 2007] Retrieved from the Internet <URL: http://www.faqs.org/rfcs/rfc2578.html>.
Nevill-Manning, C. et al., "Identifying Hierarchical Structure in Sequences: A linear-time algorithm," Journal of Artificial Intelligence Research, vol. 7, Sep. 1997, pp. 67-82, [Retrieved on May 17, 2007] Retrieved from the Internet <URL: http://arxiv.org/abs/cs/9709102>.
Tal, O. et al., "Syntax-based Vulnerability Testing of Frame-based Network Protocols," Proceedings: 2nd Annual Conference on Privacy, Security and Trust, Fredericton, Canada, Oct. 2004, pp. 155-160, [Retrieved on May 17, 2007] Retrieved from the Internet <URL: http://post.queensu.ca/~trd/research/papers/FinalPST04.pdf>.
Turcotte, Y. et al., "Security Vulnerabilities Assessment of the X.509 Protocol by Syntax-based Testing," Military Communications Conference (MILCOM), Monterey, CA, Oct. 2004, vol. 3, pp. 1572-1578, [Retrieved on May 17, 2007] Retrieved from the Internet <URL: http://post.queensu.ca/~trd/research/papers/MILCOM.pdf>.
Zhang, S. et al., "A Lightweight Approach to State Based Security Testing," Proceedings: 16th IBM Centre for Advanced Studies Conference (CASCON), Toronto, Canada, Oct. 2006, Article No. 28, [Retrieved on May 17, 2007] Retrieved from the Internet <URL: http://post.queensu.ca/~trd/research/papers/zhangState.pdf>.
Zhang, S. et al., "Applying Software Transformation Techniques to Security Testing," Proceedings: Software Technology and Engineering in Practice (STEP), Toronto, Canada, Oct. 2005, [Retrieved on May 17, 2007] Retrieved from the Internet <URL: http://post.queensu.ca/~trd/research/papers/step2005.pdf>.
Aitel, D., "An Introduction to SPIKE, the Fuzzer Creation Kit" (presentation slides), Aug. 1, 2002, Black Hat USA, Las Vegas, NV, [online] [Retrieved Jun. 26, 2007], Retrieved from the Internet <URL: https://www.blackhat.com/presentations/bh-usa-02/bh-us-02-aitel-spike.ppt>.
Beddoe, M., "Heuristics for Packet Field Identification," Mu Security Research Labs blog, Jan. 4, 2007, [online] [Retrieved Jun. 26, 2007], Retrieved from the Internet <URL: http://labs.musecurity.com/2007/01/04/heuristics-for-packet-field-identification/>.
Beddoe, M., "The Protocol Informatics Project: Automating Network Protocol Analysis" (presentation slides), 2005.
Sonne, B., "Covert Channel detection using Bioinformatics Algorithms," nCircle 360 Security blog, May 11, 2006, [online] [Retrieved on Jun. 26, 2007] Retrieved from the Internet <URL: http://blog.ncircle.com/archives/2006/05/covert_channel_detection_using.html>.

\* cited by examiner

MODIFICATION OF MESSAGES FOR ANALYZING THE SECURITY OF COMMUNICATION PROTOCOLS AND CHANNELS

REFERENCE TO RELATED APPLICATION

This application is related to the following utility application, which is hereby incorporated by reference in its entirety: U.S. application Ser. No. 11/514,809, filed on Sep. 1, 2006, entitled "Automated Generation of Attacks for Analyzing the Security of Communication Protocols and Channels."

BACKGROUND

The present invention relates to automated generation of attacks for security analysis of hardware and software.

Computerized communication, whether it occurs at the application level or at the network level, generally involves the exchange of data or messages in a known, structured format (a "protocol"). Software applications and hardware devices that rely on these formats can be vulnerable to various attacks that are generally known as "protocol abuse." Protocol abuse consists of sending messages that are invalid or malformed with respect to a particular protocol ("protocol anomalies") or sending messages that are well-formed but inappropriate based on a system's state. Messages whose purpose is to attack a system are commonly known as malicious network traffic.

Various systems have been developed that identify or detect attacks when they occur. This functionality, which is known as intrusion detection, can be implemented by a system that is either passive or active. A passive intrusion detection system (IDS) will merely detect an attack, while an active IDS will attempt to thwart the attack. Note that an IDS reacts to an actual attack. While an IDS might be able to detect an attack, it does not change the fact that an attack has occurred and might have damaged the underlying system.

A proactive solution to the attack problem is to analyze a system ahead of time to discover or identify any vulnerabilities. This way, the vulnerabilities can be addressed before the system is deployed or released to customers. This process, which is known as "security analysis," can be performed using various methodologies. One methodology for analyzing the security of a device-under-analysis (DUA) is to treat the DUA as a black box. Under this methodology, the DUA is analyzed via the interfaces that it presents to the outside world. As a result, it is not necessary to access the source code or object code comprising the DUA.

For example, a security analyzer sends one or more messages (test messages) to the DUA, and the DUA's response is observed. A response can include, for example, registering an error or generating a message (response message). The DUA can then send the response message to the security analyzer. Depending on the analysis being performed, the security analyzer might send another test message to the DUA upon receiving the response message from the DUA. The test messages and response messages can be analyzed to determine whether the DUA operated correctly.

Some protocols involve a series of message exchanges between two endpoints (e.g., a client and a server). Ideally, an endpoint would receive a first message from another endpoint, process the first message correctly, and transmit a proper second message to the other endpoint. In order to analyze whether one endpoint (the DUA) is operating correctly, the other endpoint is modified to process the first message incorrectly and/or transmit an improper second message to the DUA. This testing method requires the other endpoint to be completely re-implemented, which takes a long time to prototype and test.

SUMMARY

One way to test the implementation of a protocol by a device-under-analysis (DUA) is to send the DUA an improper message (e.g., a message that does not conform to the protocol). If these messages are part of a series of message exchanges between the DUA and an endpoint, the endpoint must be completely re-implemented, which takes a long time to prototype and test. An alternative is to use the original endpoint (which is supposed to work correctly) and allow it to transmit a message, but change this message before it reaches the DUA. For example, the original endpoint receives a first message from the DUA, processes the first message correctly, and attempts to transmit a proper second message to the DUA. Before the second message reaches the DUA, it is intercepted and replaced with an improper (i.e., test) message. The DUA then receives the improper message. In one embodiment, the replacement message is improper because its structure and/or syntax does not conform to the appropriate protocol. In this embodiment, analysis of the DUA would be similar to syntax-based vulnerability testing of the DUA's implementation of the protocol.

In one embodiment, a system is used to analyze a DUA's implementation of a protocol. The system includes a source endpoint, a destination endpoint (the DUA), and a message generator. The source endpoint generates an original message and attempts to send it to the DUA. The original message is intercepted by the message generator, which generates a replacement message. The replacement message is then sent to the DUA instead of the original message. The replacement message is deliberately improper so as to analyze the DUA's implementation of the protocol.

In one embodiment, the message generator includes a structure recognition system and a mutation system. The structure recognition system determines the underlying structure and/or semantics of a message (e.g., the original message). After the structure recognition system has determined the structure, it creates a description of the structure (a structure description). The mutation system modifies the message based on the structure description to generate a replacement message.

The message generator can include other components in addition to the structure recognition system and the mutation system. In one embodiment, the message generator includes a flow engine, which implements an Internet Protocol (IP) stack. In another embodiment, the message generator includes a rule system, which determines whether a particular message should be forwarded to the DUA as-is or subjected to further processing.

Other aspects of the invention include software, systems, components, and methods corresponding to the above, and applications of the above for purposes other than security analysis.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

In the following description, "device," "device-under-analysis," and "DUA" represent software and/or hardware. Software includes, for example, applications, operating systems, and/or communications systems. Hardware includes, for example, one or more devices. A device can be, for example, a switch, bridge, router (including wireline or wireless), packet filter, firewall (including stateful or deep inspection), Virtual Private Network (VPN) concentrator, Network Address Translation (NAT)-enabled device, proxy (including asymmetric), intrusion detection/prevention system, or network protocol analyzer. A DUA can also be multiple devices that are communicatively coupled to form a system or network of devices. For example, a DUA can be two firewall devices that establish an encrypted tunnel between themselves.

A "protocol" refers to an exchange of data or messages in a known, structured format. Specifically, a protocol refers to what is being communicated (for example, the data or message content). Types of protocols include, for example, networking protocols (including network packets), application program interfaces (APIs; including API calls, remote method invocation (RMI), and remote procedure call (RPC)), and file formats.

A protocol generally has three characteristics: structure, semantics, and state. Protocol structure (also known as syntax) refers to the layout of a message, such as its fields, arguments, or parameters, and its possible length. Protocol semantics refers to the context of a message, such as its actual content and what the content means. Protocol state refers to how the history of previous messages affects later messages.

Recall that one way to test a DUA's implementation of a protocol is to send the DUA an improper message (e.g., a message that does not conform to the protocol). If these messages are part of a series of message exchanges between the DUA and an endpoint, the endpoint must be completely re-implemented, which takes a long time to prototype and test.

An alternative is to use the original endpoint (which is supposed to work correctly) and allow it to transmit a message, but change this message before it reaches the DUA. For example, the original endpoint receives a first message from the DUA, processes the first message correctly, and attempts to transmit a proper second message to the DUA. Before the second message reaches the DUA, it is intercepted and replaced with an improper (i.e., test) message. The DUA then receives the improper message.

In one embodiment, the replacement message is improper because its structure and/or syntax does not conform to the appropriate protocol. In this embodiment, analysis of the DUA would be similar to syntax-based vulnerability testing of the DUA's implementation of the protocol.

System

Figure 1:
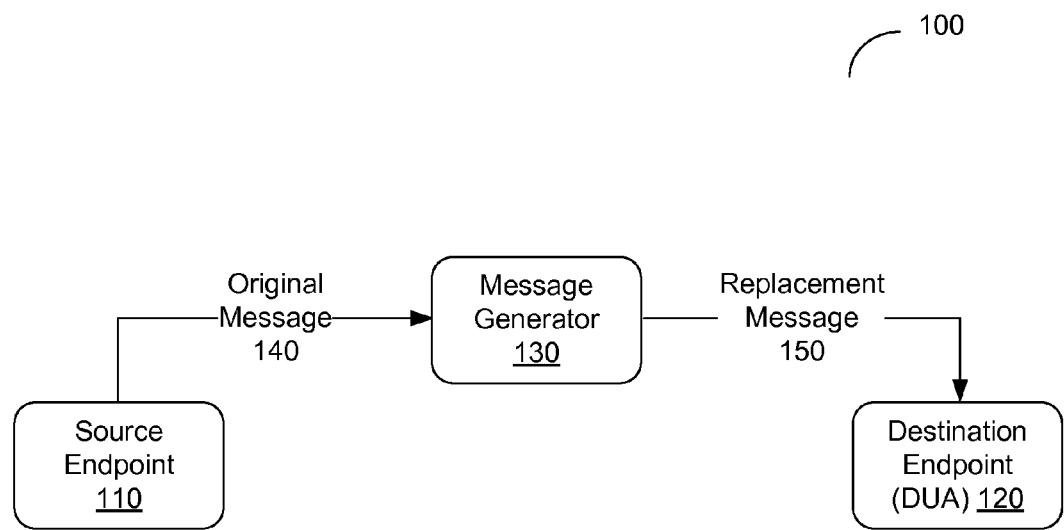
FIG. 1 illustrates a block diagram of a system for analyzing a DUA's implementation of a protocol, according to one embodiment of the invention.

FIG. 1 illustrates a block diagram of a system for analyzing a DUA's implementation of a protocol, according to one embodiment of the invention. The system 100 includes a source endpoint 110, a destination endpoint 120, and a message generator 130. The destination endpoint 120 is the device that is being analyzed (i.e., the DUA). The source endpoint 110 is the device that is communicating with the DUA 120 according to the protocol whose implementation is being tested. The source endpoint 110 generates an original message 140 and attempts to send it to the DUA 120. In one embodiment, the message is a network packet or a protocol data unit (PDU). The original message 140 is intercepted by the message generator 130, which generates a replacement message 150. The replacement message 150 is then sent to the DUA 120 instead of the original message 140. The replacement message 150 is deliberately improper so as to analyze the DUA's implementation of the protocol.

The message generator 130 can intercept the original message 140 in various ways. In one embodiment, the source endpoint 110 uses the message generator 130 as a proxy. In this embodiment, the message generator 130 receives all messages that are sent from the source endpoint 110 to the DUA 120. When the message generator 130 receives a message, it can forward the message in its original form (i.e., unaltered) or generate a replacement message 150 and send the replacement message to the DUA 120 instead. The network traffic can be proxied either directly or via a layer-2 bridge. Note that using a layer-2 bridge enables modification of a packet at any layer while the packet is in transit. A layer-2 bridge also makes it easier to change the functionality of the message generator 130 if desired.

In order for the DUA 120 to be analyzed, the system 100 would also include a security analyzer (not shown). Security analyzers are further discussed in U.S. application Ser. No. 11/351,403, filed on Feb. 10, 2006, entitled "Platform for Analyzing the Security of Communication Protocols and Channels," which is hereby incorporated by reference in its entirety.

Message Generator

Figure 2:
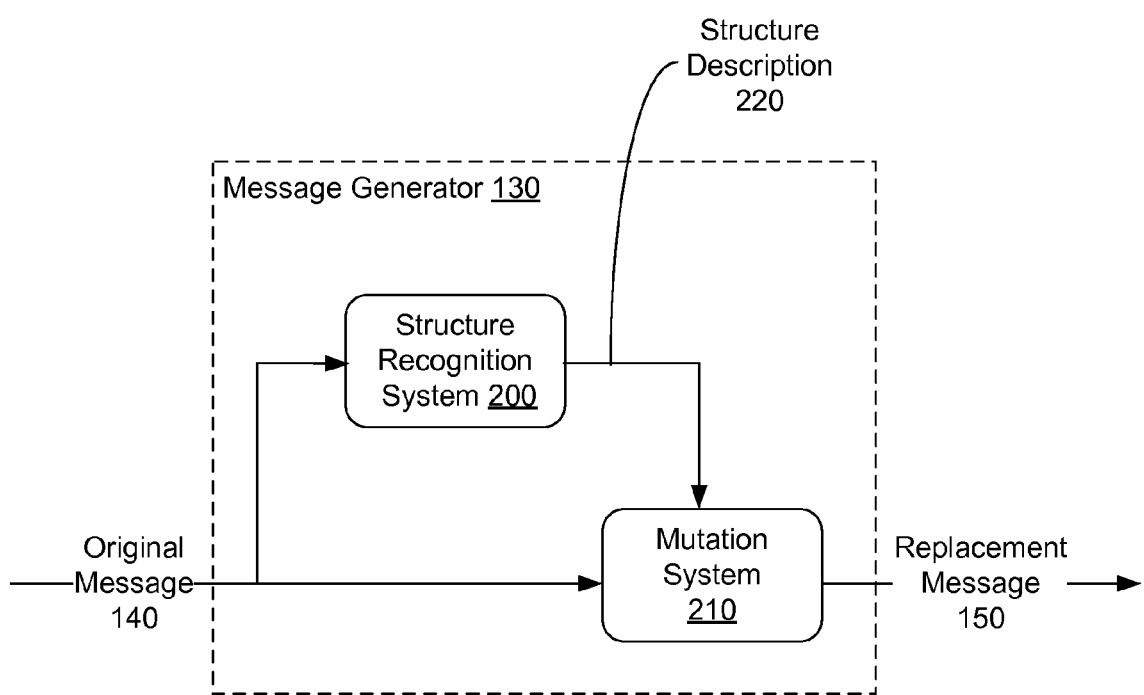
FIG. 2 illustrates a block diagram of a message generator, according to one embodiment of the invention.

The message generator 130 can generate the replacement message 150 in various ways. In one embodiment, the message generator 130 first determines the underlying structure of a message (e.g., original message 140) and then modifies the message based on this structure. FIG. 2 illustrates a block diagram of a message generator, according to one embodiment of the invention. The message generator 130 includes a structure recognition system 200 and a mutation system 210. The message generator 130 receives a message (e.g., original message 140), and the message is input into the structure recognition system 200 and the mutation system 210.

The structure recognition system 200 determines the underlying structure and/or semantics of a message. For example, the structure recognition system 200 determines one or more fields that are included in the message, including their locations, lengths, and semantic meanings. This automated field identification is sometimes called protocol analysis or protocol reverse engineering. Since a protocol adheres to a syntax or grammar, this area of study is called grammatical inference, grammar induction, automata induction, and automatic language acquisition.

In one embodiment, the structure recognition system 200 identifies the structure heuristically using a grammar-building algorithm. Various heuristics can be used, including delimiters, protocol extensions, sliding windows, sequence alignment, and the Sequitur algorithm. These heuristics will be described below.

After the structure recognition system 200 has determined the structure, it creates a description of the structure (structure description 220). In one embodiment, the structure description 220 describes the abstract syntax of a protocol (e.g., locations of various field boundaries within a message). In another embodiment, the structure description 220 describes the semantics of various fields within the message. For example, the structure description 220 includes a list of offsets where the field boundaries exist and any metadata associated with the semantic types of the fields. In yet another embodiment, the structure description 220 describes how various fields of the message can be mutated (i.e., modified) for testing purposes.

In one embodiment, the structure description 220 comprises text that conforms to the eXtended Markup Language (XML) format. For example, the structure description 220 conforms to a new, proprietary format such as Open Protocol Modeling (OPM) XML. An exemplary structure description 220 will be discussed below.

After the structure description 220 has been generated, it is transmitted to the mutation system 210. The mutation system 210 modifies a message (based, in part, on the structure description 220) to generate the replacement message 150. For example, the mutation system 210 receives a message and a structure description 220 and parses the message using the structure description 220. The mutation system 210 then identifies a field of the message and injects invalid data into that field, thereby generating the replacement message 150.

In one embodiment, the mutation system 210 has access to a large library (not shown) of mutations and attacks against certain field semantics, such as lengths, Uniform Resource Locators (URLs), etc. The mutation system 210 takes the message off the network, modifies it so that it contains a type of mutation (thereby generating the replacement message 150), and sends the replacement message back out on the network. In one embodiment, for repeatability purposes, the mutation system 210 tracks which changes have been made to a message and the current state of the protocol stream when the replacement message was injected.

The mutation system 210 can also modify a message in a random manner. In this mode, a random offset in the message and a random length are chosen. The mutation system 210 then randomly flips bits in the message to generate the replacement message. The seed is logged for repeatability purposes.

The mutation system 210 is further described in U.S. application Ser. No. 11/514,809, filed on Sep. 1, 2006, entitled "Automated Generation of Attacks for Analyzing the Security of Communication Protocols and Channels." In particular, that application describes how to automatically generate a message that tests a particular a protocol (e.g., based on a description of the protocol or the protocol's grammar, which is similar to the structure description 220).

The message generator 130 can include other components in addition to the structure recognition system 200 and the mutation system 210. In one embodiment, these components process the original message 140 before it is passed to the mutation system 210, thereby forming a processing pipeline. The components can be used in any order, as long as they process the message before it reaches the mutation system 210.

For example, the message generator 130 can include a flow engine (not shown). The flow engine implements an Internet Protocol (IP) stack. The flow engine associates a message with a session that is flowing through the message generator 130. The flow engine can also defragment a message (e.g., an IP message), reassemble a stream of messages (e.g., messages according to the Transmission Control Protocol (TCP)), and re-order messages.

In one embodiment, the flow engine parses a message to obtain meta-data associated with the message. Examples of meta-data obtained from the message include information about the source and/or destination of a packet (e.g., IP address and port number) and the lower-level protocol used to send the packet (e.g., TCP or User Datagram Protocol (UDP)). The flow engine can also track other meta-data, such as the session associated with the packet and information about fragmentation and reassembly (e.g., the packet's initial order within the stream). The flow engine then outputs not only the message (which might have been processed) but also any meta-data.

As another example, the message generator 130 can include a rule system (not shown). The rule system determines whether a particular message should be forwarded to the DUA 120 as-is or subjected to further processing within the message generator 130. For example, the rule system can use a filter to identify a message based on various characteristics. These characteristics can include both the message content and any meta-data associated with the message. For example, a regular expression can be used to match a string within the message's content. As another example, a filter condition can identify the third packet in a stream that was sent by a particular server. Filtering enables protocol assessment to be as shallow or deep as desired.

EXAMPLE

Consider a trap message according to the Simple Network Management Protocol (SNMP). The format of an SNMP trap message is described in RFC 1157 ("A Simple Network Management Protocol (SNMP)," by J. Case et al., May 1990). The message includes a top-level message and a protocol data unit (PDU). The top-level message has the following format:

```
SEQUENCE {
    version         -- version-1 for RFC 1157
        INTEGER {
            version-1(0)
        },
    community       -- community name
        OCTET STRING
}
The PDU has the following format:
IMPLICIT SEQUENCE {
    enterprise      -- type of object generating trap
        OBJECT IDENTIFIER,
    agent-addr      -- address of object generating trap
        NETWORK ADDRESS
    generic-trap    -- generic trap type
        INTEGER {
            coldStart(0),
            warmStart(1),
            linkDown(2),
            linkUp(3),
            authenticationFailure(4),
            egpNeighborLoss(5),
            enterpriseSpecific(6)
        },
    specific-trap   -- enterprise-specific code
        INTEGER,
    time-stamp      -- time elapsed between last (re)initialization of
                       network entity and generation of trap
        TimeTicks,
    variable-bindings -- "interesting" information
        VarBindList
}
```

In one embodiment, the structure description 220 of the SNMP trap message is:

```
<protocol>
<message name="trap">
<list name="message">
<asn.sequence name="seq">
    <asn.integer name="version" value="0"/>
    <asn.string.octet name="community" value="public"/>
```

-continued

```
<asn.tag name="pdu" value="0xa4">
    <asn.oid name="enterprise-id" value="1.3.6.1.4.1.31337.0"/>
    <asn.ip name="agent-addr" value="127.0.0.1"/>
    <asn.integer name="generic-trap" value="0"/>
    <asn.integer name="specific-trap" value="0"/>
    <asn.timeticks name="timestamp" value="0"/>
    <asn.sequence name="varbind">
        <list name="list">
        <asn.sequence name="varbind0">
            <asn.oid name="name" value="1.3.6.1.2.1.2.1.0"/>
            <asn.integer name="value" value="0x21"/>
        </asn.sequence>
        </list>
    </asn.sequence>
</asn.tag>
</asn.sequence>
</list>
</message>
</protocol>
```

The SNMP trap message represented by the above structure description 220 has the following characteristics: a version value of 0, a community value of public, an enterprise-id value of 1.3.6.1.4.1.31337.0, an agent-addr value of 127.0.0.1, a generic-trap value of 0, a specific-trap value of 0, a timestamp value of 0, a binding of the "name" variable to 1.3.6.1.2.1.2.1.0, and a binding of the "value" variable to 0x21.

Note that the structure description 220 above includes different data types (asn.sequence, asn.integer, asn.string.octet, asn.tag, etc.). The mutation system 210 includes instructions for mutating each data type. For example, if the mutation system 210 receives a structure description 220 that includes the asn.integer data type, it can determine how to mutate that portion of the corresponding message. Appendix A contains exemplary data types.

SNMP version 2 is described in RFC 2578 ("Structure of Management Information Version 2 (SMIv2)," by K. McCloghrie et al., April 1999).

Heuristics for Determining Structure

Recall that, in one embodiment, the structure recognition system 200 identifies the structure of a message heuristically using a grammar-building algorithm. Various heuristics can be used, including delimiters, protocol extensions, sliding windows, sequence alignment, and the Sequitur algorithm.

Delimiters

A delimiter is a sequence of one or more characters that is used to specify a boundary between regions in a data stream (e.g., between fields in a message). Commonly-used delimiters include the comma character, the tab character, and the newline character (which is a carriage return character and/or line feed character). In order to identify the structure of a message, the structure recognition system 200 would determine the location of each delimiter within the message. These locations would signal the field boundaries within the message.

Note that delimiters can be used on a message-by-message basis. In other words, an algorithm that relies on delimiters to define structure does not need to be pre-exposed to several messages for training purposes.

Protocol Extensions

Many protocols can be extended for special uses. These protocols include, for example, HTTP (HyperText Transfer Protocol), SIP (Session Initiation Protocol), and SMTP (Simple Mail Transfer Protocol). RFC 2774 ("An HTTP Extension Framework," by H. Nielsen et al., February 2000) describes a framework for HTTP extensions. RFC 1869 ("SMTP Service Extensions," by J. Klensin et al., November 1995) describes service extensions for SMTP.

If a message conforms to a particular base protocol but possibly includes extensions, then the message can be parsed according to the base protocol. Contents of the message that differ from the base protocol will be treated as extensions to the protocol.

Sliding Windows

A message is analyzed using an n-byte sliding window. The sliding window helps identify important fields such as lengths. In one embodiment, a 1-, 2- and 4-byte sliding window is applied to a message, and the remaining length of the message is compared to the value inside the sliding window. The match can be either exact or within a margin of error, typically the size of the sliding window itself.

For example, consider the following 12-byte message, where a pair of digits represents a byte:
04 06 00 08 41 41 41 41 41 41 41 41

Applying a 1-byte sliding window to the message yields the following, where the format used is offset of window [value of window]–number of bytes remaining:
0 [04]–11
1 [06]–10
2 [00]–9
3 [08]–8
4 [41]–7
. . .

Applying a 2-byte sliding window to the message yields the following, where the format used is offset of window [value of window]–number of bytes remaining:
0 [04 06]–10
1 [06 00]–9
2 [00 08]–8
3 [08 41]–7
4 [41 41]–6
. . .

Note that with the 1-byte sliding window, placing the window at offset 3 results in a window value (08) that equals the number of bytes remaining in the message (8). Similarly, with the 2-byte sliding window, placing the window at offset 2 results in a window value (00 08) that equals the number of bytes remaining in the message (8). Thus, it is probable that either the 8-bit (1-byte) value at offset 3 or the 16-bit (2-byte) value at offset 2 contains the length of the rest of the message.

Other factors can also be taken into consideration when performing this type of heuristic analysis, such as the transport protocol in use. For example, datagram protocols may not have a top level length value prepended to data blocks. Blocks can also be identified in a message by using a variable length sliding window and comparing each window to one another based on a fuzzy match, such as Kolmogorov Complexity. This would work by choosing a window size such as 32-bytes and sliding the window over the message. This window would then be compressed using a dictionary based algorithm and saved for later comparison. "N" more windows would be processed and then compared to one another's compression grammar. The most similar data sets could be considered blocks within the message as long as they were sufficiently distributed in the message stream (e.g., not overlapping).

Note that sliding windows can be used on a message-by-message basis. In other words, an algorithm that relies on sliding windows to define structure does not need to be pre-exposed to several messages for training purposes.

Sequence Alignment

Performing heuristic analysis of protocol fields is more challenging when the packets contain variable-length fields.

When this occurs, it is difficult to compare packets to one another to assess the similarities and differences at data offsets. In one embodiment, to solve this problem, sequence alignment algorithms are used to align variable-length packets. After the packets have been aligned, their consensus sequences can be analyzed to determine the beginnings and ends of the fields in the packets.

Sequence alignment algorithms are used in biology to understand the relationship between two sequences of genetic information (e.g., DNA) or amino acids. A sample sequence is compared to a database of sequences whose structure is known. The sample sequence is aligned to a particular length by inserting gaps where necessary. These same algorithms can be used to align two strings, each of which represents a message that conforms to a particular protocol.

For example, consider the following strings:
GET/index.html HTTP/1.0
GET/HTTP/1.0
Although both strings conform to HTTP, they differ in length. As a result, their fields are not aligned. The second string can be aligned to the first string by inserting several spaces (denoted as "_") after the first "/" character, as follows:
GET/index.html HTTP/1.0
GET/_____HTTP/1.0

Note that a sequence alignment algorithm uses multiple samples (e.g., messages or packets). Thus, the quality of an alignment will increase as more packets are processed and the algorithm "learns" over time. Various alignment algorithms can be used, such as Levenshtein edit distance, Needleman-Wunsch, Smith-Waterman, and Hidden Markov Model techniques. The result however, is the same: a set of messages aligned to the same length, with gaps inserted where necessary.

Once this data is assembled, the structure recognition system 200 scores down each column using a sliding window and attempts to identify characteristics of certain types of fields. Consider the following alignment:
x08 x00 xad x4b x05 xbe x00 x60
x08 x00 x30 x54 x05 xbe x00 x26
x08 x00 xf7 xb2 x05 xbe x00 x19
x08 x00 x01 xdb x05 xbe x00 x0e
x08 x00 x4f xdf x05 xbe x00 x2f
x08 x00 xf8 xa4 x05 xbe x00 x27
x08 x00 xe8 x28 x05 xbe x00 x4c
x08 x00 xe8 x6c x05 xbe x00 x10
x08 x00 xc3 xa9 x05 xbe x00 x1a
x08 x00 xdd xc1 x05 xbe x00 x56
x08 x00 x88 x42 x05 xbe x00 x50
x08 x00 xb0 x42 x05 xbe x00 x39
x08 x00 x3e x38 x05 xbe x00
x08 x00 x99 x36 x05 xbe x00 x42
x08 x00 x0f x56 x05 xbe x00 x36
x08 x00 xe6 xda x05 xbe x00 x03
x08 x00 x83 xd9 x05 xbe x00 x1b
x08 x00 xc1xd9 x05 xbe x00 x5e Various pieces of information can be used to determine where field boundaries exist in the messages. For example, notice the consensus value for each column. In the first case, this value is 0x08. The location of this value within the ASCII character set indicates that the value is outside the range of printable characters. In other words, the value is binary data.

Also, notice the rate at which a column changes values in relation to its neighboring columns. For example, if the sliding window size is 2 bytes and if the column of the least significant byte is changing more rapidly than the most significant byte, it may be indicative of a sequence number that is increasing as time goes on. Another example would be if two bytes changed at exactly the same rate 100% of the time. This could mean that this is a checksum field or a random identifier. A field that contains a large amount of gaps can be assumed to be a variable-length field. Therefore, identification of a prepended length field should be attempted.

Using sequence alignment algorithms for protocol analysis is known as protocol informatics. Protocol informatics is further described in "Network Protocol Analysis using Bioinformatics Algorithms" by Marshall A. Beddoe, available at http://www.4tphi.net/~awalters/PI/pi.pdf.

Sequitur

Sequitur is an algorithm that infers a hierarchical structure (such as message syntax) from a sequence of discrete symbols (such as a string). Sequitur replaces repeated phrases with a grammatical rule that generates the phrase and continues this process recursively. The result is a hierarchical representation of the original sequence, which offers insight into its lexical structure. The algorithm is driven by two constraints that reduce the size of the grammar and produce structure as a by-product. Sequitur is further described in "Identifying Hierarchical Structure in Sequences: A linear-time algorithm" by Craig G. Nevill-Manning et al., Journal of Artificial Intelligence Research, Vol. 7, 1997, pp. 67-82.

Additional Embodiments

A message generator 130, a structure recognition system 200, and a mutation system 210 can each be implemented in hardware, software, or a combination of both. Also, a message can be any type of structured data, such as a file. If the message is a file, the DUA would be the software application or device that opens and/or executes the file.

In the preceding description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to an apparatus for performing the operations herein. This apparatus is specially constructed for the required purposes, or it comprises a general-purpose computer selectively activated or reconfigured by a computer program stored in the computer. Such a computer program is stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems are used with programs in accordance with the teachings herein, or more specialized apparatus are constructed to perform the required method steps. The required structure for a variety of these systems will appear from the description below. In addition, the present invention is not described with reference to any particular programming language. It will be appreciated that a variety of programming languages may be used to implement the teachings of the invention as described herein.

APPENDIX A

Data types include, for example:
ASCII (American Standard Code for Information Interchange): ascii.crlf, ascii.cstring, ascii.dsv, ascii.ipv4, ascii.length, ascii.version
ASN (Abstract Syntax Notation): asn.counter, asn.gauge, asn.id, asn.integer, asn.ip, asn.null, asn.oid, asn.sequence, asn.string.bit, asn.string.general, asn.string.ia5, asn.string.octet, asn.string.printable, asn.string.utc, asn.string.utf8, asn.tag, asn.timeticks
Block
Checksum: checksum.adler32, checksum.crc16, checksum.crc32, checksum.ipv4
Data: data.align, data.random
Encode: encode.base64, encode.qprint
File: file.path
HTTP (HyperText Transfer Protocol): http.header
List
Message
Net: net.ipv4, net.ipv6, net.mac
SMTP (Simple Mail Transfer Protocol): smtp.domain, smtp.mailbox, smtp.path
String
Type: type.count16, type.count32, type.count8, type.id16, type.id32, type.id8, type.length16, type.length32, type.length8, type.offset16, type.offset32, type.offset8, type.uint16, type.uint32, type.uint8
XDR (eXternal Data Representation): xdr.array, xdr.integer, xdr.opaque, xdr.string

What is claimed is:

1. A method of modifying a network message for use with a message generator testing a device-under-analysis (DUA), comprising:

receiving at the message generator including a processor a network message conforming to a network message protocol sent by a source system that was intended for the DUA, the message being received at the message generator before the network message was received by the DUA;
after receiving the message, determining a packet structure of the network message based, at least in part, on the content of the network message;
after determining the packet structure, creating a description of the packet structure of the message;
modifying the network message based on the description to create a modified message that is at least one of invalid or malformed with respect to the protocol or inappropriate based on the protocol's current state; and
sending the modified message from the message generator toward the DUA in place of the network message.

2. The method of claim 1, wherein determining the structure of the network message comprises
determining one or more fields that are included in the network message based, at least in part, on the content of the network message.

3. The method of claim 1, wherein determining the structure of the network message comprises
determining the structure of the message with a heuristic based, at least in part, on the content of the network message.

4. The method of claim 2, wherein the heuristic comprises using a sequence alignment algorithm to align variable length packets.

5. The method of claim 2, wherein the heuristic comprises one element of a group containing a delimiter, where the delimiter includes guessing the location of fields in the protocol based on the presence of commonly used delimiter characters, and a protocol extension, where the protocol extension includes parsing a portion of the message that conforms to a base protocol according to the based protocol while treating portions of the message that do not conform to the base protocol as a protocol extension.

6. The method of claim 2, wherein the heuristic comprises one element of a group containing a sliding window and a Sequitur algorithm to infer the location of fields in the packet.

7. The method of claim 1, wherein the description comprises text that conforms to the extended Markup Language (XML) format.

8. The method of claim 1, wherein modifying the network message further comprises:
parsing the network message based on the description;
identifying a field of the parsed message; and
injecting invalid data into the field.

9. A method of modifying a message for use with a message generator testing a device-under-analysis (DUA), comprising:

receiving at the message generator including a processor a message conforming to a protocol sent by a source system that was intended for the DUA, the message being received at the message generator before the message was received by the DUA;
wherein the message comprises a network packet;
after receiving the message, determining a packet structure of the message based, at least in part, on the content of the message;
after determining the structure, creating a description of the packet structure of the message;
modifying the message based on the description to create a modified message that is at least one of invalid or malformed with respect to the protocol or inappropriate based on the protocol's current state; and sending the modified message from the message generator toward the DUA in place of the message.

10. The method of claim 1, wherein the message generator intercepts the network message from the source system to the DUA.

11. A computer program product for modifying a network message for use in testing a device-under-analysis (DUA), the computer program product comprising a non-transitory computer-readable medium containing computer program code for performing a method, the method comprising:

receiving a network message conforming to a network message protocol sent by a sending system that was intended for the DUA, the network message being received before the network message was received by the DUA;

after receiving the message, determining a structure of the network message based, at least in part, on the content of the network message;

after determining the structure, creating a description of the structure of the network message;

modifying the network message based on the description to create a modified message that is at least one of invalid or malformed with respect to the protocol or inappropriate based on the protocol's current state; and sending the modified message toward the DUA in place of the network message.

12. A system for modifying a network message conforming to a protocol, the system comprising:

a structure recognition system including a processor configured to determine, after receipt of the network message and based, at least in part, on the content of the network message, a structure of the message and to create a description of the structure;

and a mutation system including a processor configured to modify the network message based on the description to create a modified message that is at least one of invalid or malformed with respect to the protocol or inappropriate based on the protocol's current state.

13. The system of claim 12, wherein the structure recognition system is configured to heuristically determine one or more fields that are included in the network message based, at least in part, on the content of the network message, and wherein the mutation system is configured to inject invalid data into the one or more fields determined by the structure recognition system.

14. The system of claim 12, further comprising:

a source system generating the message for a DUA; and a message generator comprising the structure recognition system and the mutation system, the message generator configured to serve as a proxy for the source system, and to receive the message from the source system and to send the modified message in place of the message to the DUA in place.

15. The method of claim 1, further comprising:

before receiving the network message, establishing the message generator as a proxy for the source system.

16. The method of claim 15, further comprising:

proxying the message from the source system to the DUA via a layer 2 bridge.

* * * * *